United States Patent [19]
Garbrecht

[11] 3,853,861
[45] Dec. 10, 1974

[54] CEPHALEXIN INTERMEDIATE

[75] Inventor: William L. Garbrecht, Indianapolis, Md.

[73] Assignee: Eli Lilly and Company, Indianapolis, Ind.

[22] Filed: Dec. 8, 1971

[21] Appl. No.: 206,152

Related U.S. Application Data

[63] Continuation-in-part of Ser. No. 808,313, March 18, 1969, Pat. No. 3,632,850.

[52] U.S. Cl. ............................. 260/243 C, 424/246
[51] Int. Cl. ........................................... C07d 99/24
[58] Field of Search ............................... 260/243 C

[56] References Cited
UNITED STATES PATENTS
3,644,347    2/1972    Webber et al. ................ 260/243 C

*Primary Examiner*—Nicholas S. Rizzo
*Attorney, Agent, or Firm*—William B. Scanlon; Everet F. Smith

[57] ABSTRACT

Para-nitrobenzyl 7-amino-3-methyl-3-cephem-4-carboxylate hydrochloride [p-nitrobenzyl 7-aminodesacetoxycephalosporinate hydrochloride], a stable, crystalline compound, useful as an intermediate in the synthesis of cephalexin, and other antibiotics.

1 Claim, No Drawings

CEPHALEXIN INTERMEDIATE

CROSS REFERENCE

This application is a continuation-in-part of application Ser. No. 808,313, filed Mar. 18, 1969 now U.S. Pat. No. 3,632,850.

BACKGROUND OF THE INVENTION

In U.S. Pat. No. 3,275,626 there is disclosed a process whereby a pencillin sulfoxide is converted into a desacetoxy cephalosporin by heating the sulfoxide under acid conditions. The cephalosporin obtained in this manner contains a methyl group in the three position while the substituent in the seven position is that that was in the six position of the penicillin starting material. The amido group in the seven position can be cleaved by any convenient means to obtain the seven amino compound. Acylation of the 7-amino group with the proper acyl group results in the formation of antibiotically-active cephalosporins.

In order to protect the carboxyl group in the molecule during the course of the reactions involved it is preferred to use an ester of the pencillin. The ester group employed should be one that can be readily removed at the completion of the reactions since the cephalosporin free acids are more active than the cephalosporin esters.

Ester groups used heretofore have suffered from one or more disadvantages. For example, the group may be diffiuclt to remove to regenerate the free carboxyl, the group may split off during the reaction leading to undesirable by-products, or the intermediates obained in the course of the reaction may be viscous oils tha are difficult to handle. Typical of such prior art esters are the methyl, benzyl, and 2,2,2-trichloroethyl esters.

Some ester salts of 7-aminodesacetoxycephalosporanic acid are known, For example, U.S Pat. No. 3,549,628 discloses the toluenesulfonic acid napthalenesulfonic acid salts of 7-aminodesacetoxycephalosporanic acid esters where the ester group is 2,2,2-trichloroethyl, benzyloxymethyl, tert-butyl, p-methoxyphenyl, 3,5-dimethoxyphenyl, 3,5-dimethoxybenzyl or p-methoxybenzyl.

However, in the manufacture of cephalosporin antibiotics, such as in processes for synthesizing cephalexin, it is desired to obtain high yields of stable crystalline 7-aminodesacetoxycephalosporinate ester salts in as few process steps as possible, and without the necessity of using water.

SUMMARY

I have now discovered that the use of the p-nitrobenzyl ester is the synthesis of cephalexin by the ring expansion of a penicillin sulfoxide by heating under acidic conditions, followed by side chain cleavage, acylation with phenylglycine, and removal of the p-nitrobenzyl group results in increased yields and greater ease of handling and processability of the intermediates. The p-nitrobenzyl ester function confers on the several intermediate products a strong tendency to crystallize, thus enhancing isolation ease, product purity, and yields. In addition, this ester group is stable to acid go that no undesirable side products arise during the ring expansion or side chain cleavage steps due to partial de-esterification. Removal of the p-nitrobenzyl group is readily accomplished by reduction in acidic media, a clean, mild reaction free of degradation and $\Delta^2$ isomerization hazards.

This invention also provides a 7-aminodesacetoxycephalosporanic acid ester salt which is obtainable from organic liquid media, stable as a crystalline product, and which helps to extract greater 7-amino desacetoxycephalosporanic acid ester values from the reaction mixture in which it is manufactured. This ester salt is p-nitrobenzyl 7-amino-desacetoxycephalosporanate hydrochloride [4-nitrobenzyl 7-amino-3-methyl-3-cephem-4-carboxylate hydrochloride].

DESCRIPTION OF THE PREFERRED EMBODIMENT

My process is an improvement on the process of preparing cephalexin from an ester of a penicillin sulfoxide having the formula

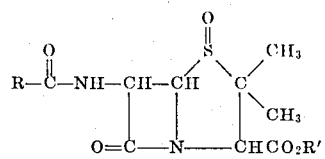

wherein R can be any organic radical so long as it is sufficiently stable to permit the desired ring expansion yet can be cleaved from the resulting cephalosporin to yield the 7-amino product and R' is the residue of an ester-forming group. From a practical standpoint I prefer to use a sulfoxide in which R is benzyl or phenoxymethyl since there are the side chains present in penicillin G and penicillin V. In accordance with my improvement, the ester-forming group represented by R' is the p-nitrobenzyl group.

The penicillin sulfoxide ester can be prepared by the oxidation of the penicillin free acid as described in U.S. Pat. No. 3,197,466 followed by esterification of the sulfoxide by treatment with a p-nitrobenzyl halide or the ester of the penicillin may first be prepared and the penicillin ester then oxidized to the sulfoxide. The manner in which the penicillin sulfoxide ester is obtained is unimportant to my process.

As the first step in the synthesis of cephalexin from this penicillin sulfoxide ester, the sulfoxide is heated under acid conditions at a temperature between about 75° and 175° C. This process is described in U.S. Pat. No. 3,275,626. This treatment results in expansion of the penicillin nucleus to yield a cephalosporin compound having the formula

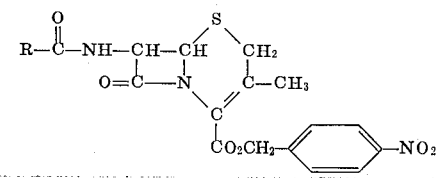

This type compound is known as a desacetoxy cephalosporin since it is substituted in the 3-position with a methyl group rather than an acetoxymethyl group as is found in cephalosporin C.

The desacetoxy cephalosporin from the first step of the process is then subjected to side chain cleavage to yield the 7-amino compound having the formula

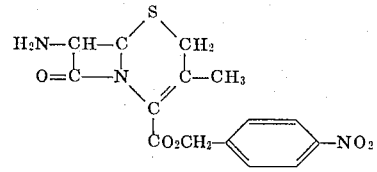

This is the p-nitrobenzyl ester of 7-aminodesacetoxycephalosporanic acid. This side chain cleavage step may be accomplished by any known procedure. Methods of side chain cleavage of cephalosporins are described in U.S. Pat. Nos. 3,188,311, 3,207,755 and 3,234,223 and 3,549,628 as well as British Patent No. 1,119,806 and Dutch Patent No. 6,513,095. The method by which the side chain is cleaved is not important to my improvement.

In the next step of the process the free amino group is acylated with phenylglycine. This acylation is accomplished using well-known acylation procedures wherein the phenylglycine is activated by a carboniimide or is used in the form of an acid chloride or bromide or mixed anhydride such as the isobutyl or sec-butyl mixed anhydride. It is to be understood that the amino group of the phenylglycine is protected during the acylation reaction with a commonly-used amino protecting group such as trimethylsilyl, t-butoxycarbonyl, benzyloxycarbonyl, p-nitrobenzyloxycarbonyl, or the enamine formed with methyl acetoacetate. All that remains to obtain cephalexin is the removal of the amine and carbonxyl blocking groups. The procedure used to remove the amine blocking group will depend upon the group employed. Removal of amine blocking groups is a common procedure known to those skilled in the art. This may be accomplished by acid hydrolysis or hydrogenolysis depending upon the group present in the molecule.

The removal of the p-nitrobenzyl group is readily accomplished by reduction in an acidic medium. This same treatment will remove certain amine blocking groups such as the enamine groups and will therefore serve to remove both blocking groups. The reduction may be accomplished chemically, such as by the use of zinc and hydrochloric acid, or by catalytic hydrogenation using catalysts such as palladium, platinum, or the oxides thereof.

All of the steps employed in this synethesis of cephalexin are well known in the prior art and no attempt is being made by me to claim any of the steps involved. My invention resides in the use of the p-nitrobenzyl group as a carboxyl protecting group during the various steps of the synthesis. Thus, my invention is an improvent in the process for the synthesis of cephalexin.

My invention also provides p-nitrobenzyl 7-aminodesacetoxycephalosporanate hydrochloride as a new compound. This compound can also be named by the "cephem" nomenclature system as p-nitrobenzyl 7-amino-3-methyl-3-cephem-4-carboxylate hydrochloride. Procedures for preparing this compound ae described hereinbelow. This compound is a stable crystalline compound which is useful as an intermediate in the synthesis of cephalexin and other cephalosporin antibiotic compounds which can be made from this 7-aminodesacetoxycephalosporanate ester salt nucleus.

My improved process will be further illustrated by the following examples.

EXAMPLE 1

A solution of 37.0 g. of penicillin V 1-oxide, 15.0 ml. of triethylamine, and 22.0 g. of p-nitrobenzyl bromide in 300 ml. of acetone is stirred for 4 hours at room temperature. A crystalline solid begins to precipitate during the first hour, and the mixture becomes quite thick during the reaction period. The mixture is treated with 600 ml. of water, stirred for one-half hour, and the solid collected and washed with water and ether. After drying, the colorless crystals weight 47 g., m.p. 186° to 196° C. The product is shown to be one component by thin layer chromatography, and its structure and purity are established by nuclear magnetic resonance spectroscopy.

p-Nitrobenzyl chloride reacts similarly to provide the desired ester if promoted by the addition of a small amount of potassium iodide. Dimethylformamide or dimethylacetamide provides a better solvent medium than acetone in this case. Esterification may be accomplished with p-nitrobenzyl alcohol via the phosgene procedure. See U.S. Pat. No. 3,586,667.

EXAMPLE 2

A solution of 10.0 g. of the p-nitrobenzyl ester of penicillin V 1-oxide obtained as described in Example 1, 1.0 g. of p-toluenesulfonic acid monohydrate, 10.0 ml. of acetic anhydride and 400 ml. of dimethylacetamide is warmed on a steam bath for 16 hours. The amber-colored solution is concentrated on the steam bath in vacuo and the residual syrup is triturated with 150 ml. of methanol causing almost immediate crystallization of the product. After chilling for several hours the tan crystals are collected, washed with methanol and dried. The crude product weighs 6.25 g., m.p. 172° to 180° C. Recrystallization from acetonitrile gives pure p-nitrobenzyl 3-methyl-7-phenoxyacetamido-$\Delta^3$-cephem-4-carboxylate as fine, colorless needles, m.p. 191° to 193° C. Purity and structure are determined by thin layer chromatography and nuclear magnetic resonance spectroscopy.

EXAMPLE 3

A mixture of 4.84 g. of the product from Example 2 and 3.80 g. of p-toluenesulfonic acid monohydrate in 100 ml. of methanol is heated under reflux for 5 hours. After cooling, unreacted starting material is recovered by filtration (1.15 g.). The mother liquor is concentrated to about 50 ml. under reduced pressure and then treated with ether to induce crystallization. After chilling, the waxy, somewhat unstable p-toluenesulfonic acid salt of p-nitrobenzyl 3-methyl-7-amino-$\Delta^3$-cephem-4-carboxylate is collected and dried. This product weighs 2.57 g. and has a m.p. of 100° to 105° C. The identity of the product is established by thin-layer chromatography and conversion to the free base, m.p. 174° to 176° C., and to the hydrochloride, m.p. (dec.) 197° to 200° C.

The p-nitrobenzyl 3-methyl-7-amino-$\Delta^3$-cephem-4-carboxylate ester p-toluenesulfonic acid salt can also be prepared by procedures described in U.S. Pat. No. 3,591,585.

EXAMPLE 4

This example illustrates a preferred method for preparing the new p-nitrobenzyl 7-amino-3-methyl-3-cephem-4-carboxylate hydrochloride of this invention.

A. Preparatin of Imino Chloride

In Situ

Pyridine 1.01 ml. (0.0125 M) and phosphorus pentachloride, 2.39 g. (0.0115M) is added to a stirred solution of 4.84 g. (0.0100M) of 4-nitrobenzyl 7-(2-phenoxyacetamido)-3-methyl-3-cephem-4-carboxylate in 50 ml. of methylene chloride at 15° C. The resulting solution is stirred for from 1 to 2.5 hours at 20° C. under an atmosphere of dry nitrogen.

B. Isobutanol Treatment of Imino Chloride

To a solution prepared as described in part A there is added 5.54 ml. (0.060 mole) of isobutanol, and stirring is continued for 2 hours while maintaining the temperature of the mixture at 20° – 25° C. During this time the intermediate product, p-nitrobenzyl 7-aminodesacetoxycephalosporinate hydrochloride, [p-nitrobenzyl 7-amino-3-methyl-3-cephem-4-carboxylate hydrochloride] crystallizes from the reaction mixture, and it is filtered, washed with 50 ml. of methylene chloride and dried. The yield of p-nitrobenzyl 7-amino-3-methyl-3-cephem-4-carboxylate hydrochloride is 3.74 g. Analysis of samples of this intermediate product by nuclear magnetic resonance (NMR), ultraviolet (UV), vapor phase chromatography (VPC) and titration analysis indicated a purity of 97 percent. Thus the correct weight yield (0.97 × 3.74) is 3.63 g. or 94% of theory.

C. 1,3-Propanediol Treatment of Imino Chloride

Following the procedure of part B above except that 2.17 ml. (0.030 mole) of 1,3-propanediol is used instead of the isobutanol, there is obtained 3.59 g. (93% theory) of p-nitrobenzyl 7-amino-3-methyl-3-cephem-4-carboxylate hydrochloride.

EXAMPLE 5

A suspension of 30.0 g. of sodium N-(2-methoxycarbonyl-l-methylvinylamino)-D-$\alpha$-phenylglycine in 500 ml. of dry acetonitrile is cooled to −10° C. and treated with stirring with 1.0 ml. of N-methylmorpholine and then with 11.0 ml. of ethyl chloroformate. This mixture is stirred for 30 minutes and 38.7 g. of the hydrochloride from Example 3 is added followed by 14.0 ml. of triethylamine dropwise over a 10 minute period. The mixture is stirred for 1 and ½ hours at −10° C., 1500 ml. of water is added rapidly dropwise, and stirring is continued for another one-half hour. The white solid which has precipitated is collected, washed with water and dried. The crude p-nitrobenzyl 3-methyl-7-[2-(2-methyoxycarbonyl-1-methylvinylamino)-2-D-phenylacetamido]-$\Delta^3$-cephem-4-carboxylate weighs 58.0 g., m.p. 158°–162° C. Recrystallization from warm methanol raises the m.p. to 188° to 190° C. The product is shown to be one component material by thin-layer chromatography and the structure is confirmed by nuclear magnetic resonance spectroscopy.

EXAMPLE 6

The process of Example 5 is repeated using 6.0 g. of the sodium salt of phenylglycine blocked with the t-butyloxycarbonyl group, 0.1 ml. of N-methylmorpholine, 100 ml. of acetonitrile, 2.20 ml. of ethyl chloroformate, 7.74 g. of the product from Example 3, and 2.8 ml. of triethylamine. There is obtained 10.1 g. of crude product, m.p. 120° to 126° C. Recrystallization from acetonitrile raises the m.p. to 130° to 132° C.

EXAMPLE 7

The product from Example 5 is subjected to hydrogenation under acidic conditions to remove both the enamine blocking group and the p-nitrobenzyl group. A Parr hydrogenation vessel is charged with 5.8 g. of the product from Example 4, 2.0 g. of 5 percent palladium on alumina, 30 ml. of 1.0 N hydrochloric acid, and 70 ml. of methanol. The mixture is agitated on a shaker for one-half hour and then hydrogenated under 50 psi. hydrogen pressure. After hydrogen uptake is complete the mixture is filtered and most of the methanol is removed under reduced pressure. The aqueous mixture is adjusted to pH 8 with concentrated ammonium hydroxide and extracted with several portions of ethyl acetate. The pH of the aqueous fraction is then adjusted to 4.5 with aqueous hydrochloric acid and crystallization is induced by the addition of 3 to 4 volumes of acetonitrile. The pure cephalexin is obtained as a slightly off-white crystalline solid which weighs 2.30 g. Purity and structure are confirmed by nuclear magnetic resonance spectroscopy.

An improved method for removing the p-nitrobenzyl ester group is now described in my U.S. application Ser. No. 108,218, filed Jan. 21, 1971.

EXAMPLE 8

The p-nitrobenzyl group is removed from the product from Example 6 by hydrogenation. The hydrogenation vessel is charged with 5.8 g. of the doubly-blocked cephalexin from Example 5, 2.0 g. of 5 percent palladium on alumina, 25 ml. of 3a ethanol, and 75 ml. of methanol. This mixture is hydrogenated on a Parr apparatus under 50 psi. hydrogen pressure. After the hydrogen uptake is complete the mixture is filtered and the catalyst washed with methanol. The combined filtrate and washings are concentrated in vacuo. The yellow residual syrup is dissolved in 150 ml. of ethyl acetate and extracted with 100 ml. of saturated sodium bicarbonate solution. The aqueous extract is stirred with 150 ml. of ethyl acetate while the pH is adjusted to about 1.5 with concentrated hydrochloric acid. The ethyl acetate layer is separated and the aqueous layer extracted with another portion of ethyl acetate. The combined ethyl acetate extract is dried over magnesium sulfate and concentrated under reduced pressure to about 50ml. volume. The solution is filtered, diluted with 200 ml. of isopropyl ether, and then treated to turbidity with benzene. After chilling for several hours the colorless solid is collected and dried. The t-butyloxycarbonyl blocked cephalexin weights 2.60 g. The structure and purity are confirmed by nuclear magnetic resonance spectroscopy.

When the amino group of the phenylglycine is protected by the enamine blocking group, the blocking group is readily removed following the acylation step by treatment with p-toluenesulfonic acid monohydrate. The product obtained is the p-nitrobenzyl ester of cephalexin, p-toluenesulfonic acid salt. This is illustrated by the following exmaple.

EXAMPLE 9

A stirred mixture of 30.0 g. of sodium N-(2-methoxycarbonyl-1-methylvinylamino)-D-$\alpha$-phenylglycine and 500 ml. of acetonitrile is chilled to −15° C. and treated with 9.0 ml. of methyl chloroformate followed by 0.5 ml. of N-methylmorpholine. After 15 minutes, 38.7 g. of the hydrochloride from Example 3 is added followed by 14.0 ml. of triethylamine in 40 ml. of acetonitrile dropwise during 30 minutes. The reaction mixture is stirred for another 2 hours allowing the temperature to gradually increase to about 20° C.

To the reaction mixture is added 25 g. of p-toluenesulfonic acid and stirring is continued for about 2 hours. The colorless crystalline precipitate of p-nitrobenzyl 3-methyl-7-phenylglycylamido-Δ³-cephem-4-carboxylate p-toluenesulfonic acid salt is collected and dried. The yield was 62.0 g., m.p. 211°–216° C. (dec.). The product is sufficiently pure for conversion to cephalexin without further treatment.

EXAMPLE 10

A mixture of 6.54 g. of the product from Example 9, 50 ml. of acetonitrile, 10 ml. of water, and 200 mg. of platinum oxide is hydrogenated under 50 psi. hydrogen. Workup of the reaction mixture as described in Example 7 yields 2.81 g. of cephalexin.

EXAMPLE 11

A mixture of 6.54 g. of the product from Example 8, 50 ml. of acetonitrile, 10 ml. of water, and 1.3 g. of zinc is stirred for 2 to 3 hours while maintaining pH 1 by periodic addition of concentrated hydrochloric acid. The reaction mixture is filtered and the pH adjusted to about 4.5 to precipitate 1.90 g. of cephalexin.

Many of the intermediates obtained in my improved process are novel compounds not known prior to my invention. These novel compounds are those having the structure

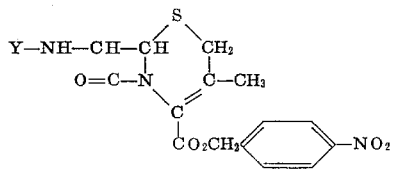

where Y is hydrogen, hydrogen and hydrogen chloride,

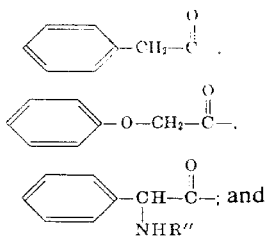

R'' is 
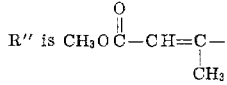
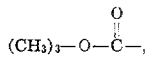
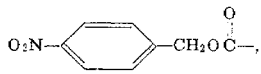

hydrogen, or hydrogen and p-toluenesulfonic acid.

All of the novel compounds of my invention are p-nitrobenzyl esters of cephalosporin compounds and are useful intermediates in the preparation of cephalexin from penicillins. The p-nitrobenzyl ester group confers unique properties on these compounds, including a tendency to crystallize, is stable under the conditions encountered in the process, but is easily removed by hydrogenation or chemical reduction under acid conditions.

These esters are those obtained from rearrangement of the esters of the sulfoxides of penicillin G, penicillin V, as well as the ester of 7-aminodesacetoxycephalosporanic acid. In addition, this amino group may be present as the p-toluenesulfonic acid salt the hydrogen chloride salt or the free amine.

I claim:

1. p-Nitrobenzye 7-aminodesacetoxycephalosporinate hydrochloride.

* * * * *